United States Patent [19]

Gray

[11] 4,192,155

[45] Mar. 11, 1980

[54] FLOATING CUSHION SUB

[75] Inventor: Gary D. Gray, Calgary, Canada

[73] Assignee: Bralorne Resources Limited, Calgary, Canada

[21] Appl. No.: 912,799

[22] Filed: Jun. 5, 1978

[30] Foreign Application Priority Data

Jul. 21, 1977 [CA] Canada .................................. 283305

[51] Int. Cl.² ......................... F16D 3/06; E21B 17/00
[52] U.S. Cl. ...................................... 64/23; 175/321
[58] Field of Search .................... 64/23, 23.5; 175/321

[56] References Cited

U.S. PATENT DOCUMENTS

| | | | |
|---|---|---|---|
| 2,240,519 | 5/1941 | Reed | 64/23 |
| 2,570,577 | 10/1951 | Manion | 175/321 |
| 3,301,009 | 1/1967 | Coulter | 64/23 |
| 3,383,126 | 5/1968 | Salvatori | 64/23 |
| 3,526,284 | 9/1970 | Burge | 64/23 |
| 3,949,150 | 4/1976 | Mason | 175/321 |
| 3,963,228 | 6/1976 | Karle | 64/23 |
| 4,055,338 | 10/1977 | Dyer | 64/23 |
| 4,130,000 | 12/1978 | Burge | 64/23 |
| 4,139,994 | 2/1979 | Ather | 175/321 |

Primary Examiner—Ira S. Lazarus
Assistant Examiner—R. C. Turner
Attorney, Agent, or Firm—H. Wayne Rock

[57] ABSTRACT

A floating cushion sub for connection to the rotary power head of a drill rig has a mandrel section connectable to a drill string and an outer housing section connectable to the power head. The mandrel and the housing have mating, axially extending splines permitting relative axial movement while also transmitting torque from the power head to the mandrel. Mandrel axial movement is limited by a cap member and by an internal shoulder in the housing. A resilient cushion adjacent the shoulder dampens vibrations when the mandrel and housing are compressed together and a similar cushion adjacent the cap member dampens vibrations when the mandrel and housing are at full extension. The axial movement of the mandrel relative to the housing improves the function of making or breaking the threaded connections with the drill string by permitting proper coordination of the mating thread pitches and reduces the chance of cross-threading.

1 Claim, 1 Drawing Figure

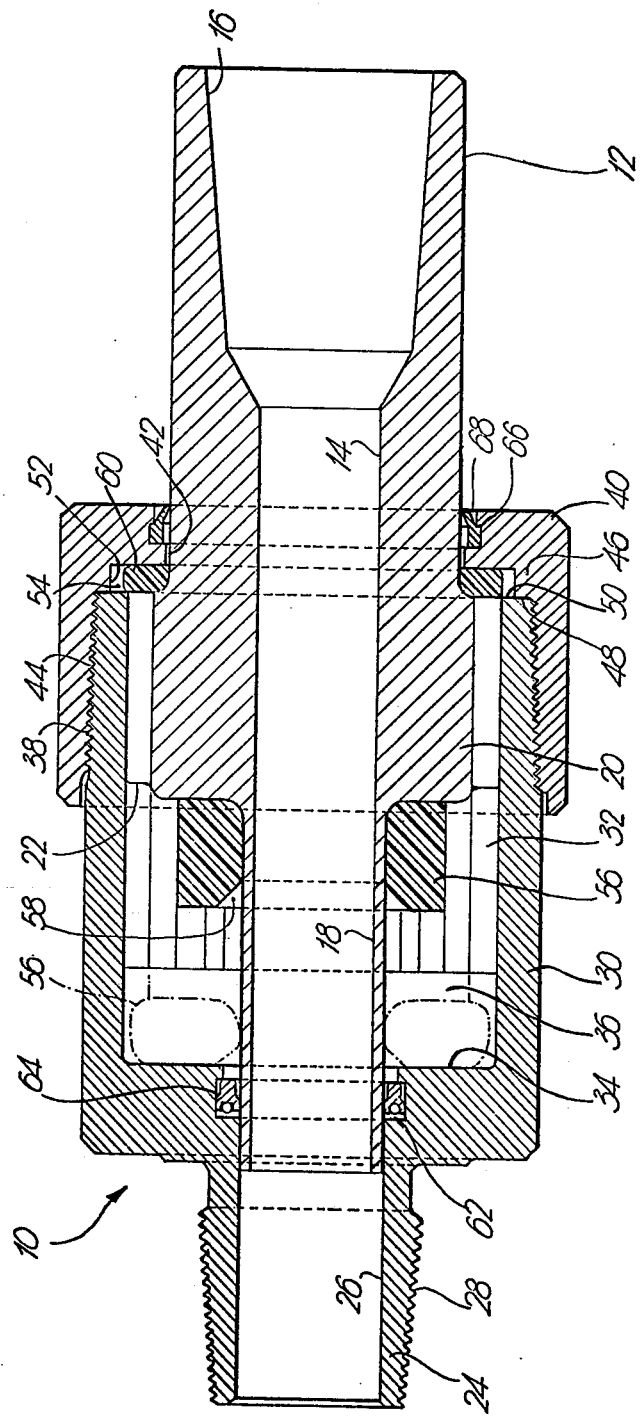

FLOATING CUSHION SUB

The present invention relates in general to longitudinally floating members for inclusion in a drill string used in earth-boring equipment and in particular to a "cushion sub" for use in such equipment.

BACKGROUND OF THE INVENTION

When boring a hole into the earth it is customary to use a drilling rig including a vertically oriented derrick and a rotary power head. Lengths of drill rod, each having a pin end (male thread) and a box end (female thread) are connected together and rotated by the power head to advance a drill bit, connected to the lowermost drill rod, into the earth. As the drill bit advances downwardly, the power head is lowered within the drill rig until it reaches its lowermost point, at which time it must be disconnected from the last section of drill rod, raised, and connected to a new section of drill rod which in turn is connected to the last section of drill rod in the drill string.

The previous method of threading together the threaded connections on a drill string involved the rotation of the power head at the same time as the male and female threads were brought together. The main problem with this method was the difficulty in coordinating the pitch of the mating threads in the horizontal plane with the vertical positioning of the thread pitch, as the two thread pitches were essentially solidly positioned apart except for the up-down feed. It was therefore difficult to start the threads in the correct pitch sequence and as a result the threads were often cross-threaded.

SUMMARY OF THE PRESENT INVENTION

The present invention has the advantage of improving the thread connecting operation on a drill string by providing a floating cushion sub which can be permanently connected to the rotary power head of the drill rig. The sub includes a mandrel section which can move axially relative to the power head so that upon rotation of the head, and the threads, there is very little solid longitudinal restriction and accordingly the threads can find their own corresponding pitches. This speeds the operation of making a threaded connection with the drill rod and also greatly reduces the chance of cross-threading. The same holds true when breaking the connection as the threads tend to float apart unhampered by solid length restrictions.

The present invention can also be used as a vibration damper by providing a suitable resilient cushion between the mandrel and an outer housing connected to the rotary power head. During drilling the mandrel and housing are compressed together and hence with the resilient material therebetween vibrations from the drill bit and drill string will be damped before they reach the power head.

The relative axial movement between the mandrel and the outer housing may be achieved through a plurality of axially extending mating splines which also act to transmit torque from the power head to the mandrel and hence to the drill string and drill bit.

Accordingly, the present invention may be broadly defined as an axially floating member for a drill string comprising a mandrel section having an axially extending through bore, a box end, an enlarged central portion, and an axial extension at the end opposite the box end, an outer housing section having a pin end, an axially extending bore through the pin end for receiving the mandrel extension, and an enlarged annular portion at the end opposite the pin end for receiving the mandrel central portion, cooperating means on the mandrel central portion and the enlarged annular portion for transmitting torque between the outer housing section and the mandrel section, and for permitting relative axial movement between the mandrel section and the outer housing section, and a cap member mountable on the annular portion and engageable with the mandrel central portion for limiting the relative axial movement.

BRIEF DESCRIPTION OF THE DRAWING

FIG. 1, the only figure, shows a cushion subh according to the present invention in axial cross-section.

DESCRIPTION OF THE PREFERRED EMBODIMENT

FIG. 1 of the drawings illustrates the longitudinally floating member 10, known to the trade as a "cushion sub", in axial cross-section.

It is seen that the cushion sub includes a mandrel portion 12 having an axially extending through-bore 14 and a conventional box end with a threaded portion 16 for connection to the pin end of a drill string (not shown). At the end opposite the box end the mandrel has an annular tubular extension 18 of constant diameter. Located between the box end and the extension is a radially enlarged central portion 20 having a plurality of circumferentially spaced, axially extending external splines 22. In practice it is expected that eight such splines would be satisfactory.

The cushion sub also includes an outer housing 24 having a conventional pin end provided with a through-bore 26 which is of such a diameter as to receive the mandrel extension 18, and a threaded portion 28 for connection to the power head of a drill rig (not shown). At the end opposite the pin end the outer housing has a radially enlarged annular portion 30 having a plurality of circumferentially spaced, axially extending, internal splines 32 which are engageable with the external splines 22 of the mandrel portion 12. An annular shoulder 34 is defined at the inner end of the enlarged portion 30, extending radially inwardly to the bore 26. With the splines 22 and 32 in engagement an annular cavity 36 is defined axially by the shoulder 34 and mandrel central portion 20 and radially by the mandrel extension 18 and the annular portion 30 of the outer housing 24.

The annular portion 30 is also provided with external threads 38 adjacent the open end thereof. A cup-shaped cap member 40 has a bore 42 in the end wall thereof for sliding reception with the mandrel box end, and also has internal threads 44 in the annular wall thereof for mating engagement with the threads 38 of the annular portion 30. An annular internal step 46 within the cap member adjacent the end wall thereof provides a shoulder 48 for abutment against the annular end face 50 of the annular portion 30. Step 46 also provides an axial face 52 which, with cap member 40 in place, radially defines an annular cavity 54 with the mandrel box end, the cavity 54 being axially defined by the end wall of the cap member and the end faces of the annular portion 30 and the mandrel central portion 20.

Positioned within the annular cavity 36 is an annular resilient cushion member 56 formed from a material such as urethane. The cushion member 56 fits tightly over the mandrel extension 18 and has a bevelled edge 58 at one end leading into the central bore thereof.

Positioned within the annular cavity 54 is a second annular resilient cushion member 60, tightly fitting over the mandrel box end and also preferably formed of urethane.

An annular recess 62 within outer housing bore 26 can receive a resilient polymeric rod seal 64 which will be in sealing engagement with the mandrel extension 18. Similarly a recess 66 within the bore 42 of cap member 40 can receive a resilient polymeric wiper ring 68 which will be in sealing engagement with the mandrel box end.

Having described the structural components of the present invention, the operation and advantages thereof will now be described. It is assumed that the cushion sub is assembled as shown in solid lines in the FIGURE.

The first function of the cushion sub of the present invention is to aid in the assembly and disassembly of the components of a drill string, namely the lengths of drill pipe. Thus, the pin end of the outer housing 24 is connected to the rotary power head in a drill rig whereby the entire assembly will be raised or lowered together with the power head. The mandrel box end will be threaded onto the drill string. Since the splines 22 and 32 permit axial motion of the mandrel relative to the outer housing (and the power head) and also transmit rotary motion from the head to the mandrel it will be possible for the mating threads in the mandrel box end to find their corresponding pitch with the mating threads in the drill pipe pin end. Accordingly, by permitting the relative vertical movement between the power head and the mandrel it is possible to coordinate the pitch of the mating threads in the horizontal plane, thereby reducing the chance of cross-threading. The advantages of the floating aspects of the present invention also apply when breaking the connections as the threads tend to float apart, unhampered by solid length restrictions as would be the case absent the cushion sub.

The second major function of the present invention is to dampen vibrations transmitted through the drill string from the bit to the power head. During downhole drilling torque is transmitted from the power head through the outer housing 24 and the splines 32, 22 to the mandrel 12 and hence to the drill string and drill bit. During drilling there will be relative compression of the mandrel 12 and outer housing 24 along the splines 32 and 22, this compression being limited by the cushion 56 as it comes up against annular shoulder 34. The compressed cushion 56 in this position is shown in phantom outline in the drawing. Thus, the cushion acts as a damper between the mandrel 12 and outer housing 24 for vibrations originating in the drill string. In a similar manner, as the string, or just the cushion sub, is pulled upwardly by the drill rig, the mandrel will move outward relative to the outer housing, such movement being limited by the cushion 60 as it is contacted by the end face of cap member 40 and the annular faces of annular portion 30 and central portion 20. Again, vibrations are dampened and it will be easier to break the threaded connection with the drill string.

Inasmuch as the drill fluid will be carried by bores 12 and 26, the rod seal 64 will serve to keep such fluid out of the cavity 36. Similarly, the wiper ring 68 will serve to keep grit and other particles out of the cavity 54. Foreign material in either cavity could impede the effectiveness of the present invention.

It is accordingly seen that the cushion sub of the present invention aids greatly in improving the function of making or breaking threaded connections in a drill string and in addition aids in the reduction of vibrations originating in the drill string and transmitted to the power head of the drill rig.

It is also seen that if the reduction of vibrations was not a prime requirement of the cushion sub it could be assembled without the cushion 56 and 60 in position. Thus, its primary function would be as a floating connection between the power head and the drill string for aiding in the making and breaking of the aforementioned threaded connections.

Undoubtedly, variations in the structure of the present invention could occur to a skilled practitioner in the art and hence the scope of protection to be afforded the present invention should be determined from the appended claims.

The embodiments of the invention in which an exclusive property or privilege is claimed are defined as follows:

1. An axially floating cushion sub for a drill string comprising:
    (a) a mandrel having an axially extending through bore, a box end for connection to a pin end of a drill string member, a radially enlarged central portion adjacent said box end, a plurality of circumferentially spaced, axially extending external splines on said central portion, and an axial extension extending from said central portion at the end opposite said box end;
    (b) an outer housing having a pin end for connection to a power head of a drill rig, an axially extending through bore in said pin end for receiving said mandrel axial extension therein, a radially enlarged annular portion adjacent the pin end, and a plurality of circumferentially spaced, axially extending internal splines in said annular portion engageable with the external splines of said mandrel central portion;
    (c) a cup-shaped cap member having an end wall with a through bore for reception of said mandrel box end, said cap member bring threadably engageable with said outer housing annular portion for retaining said mandrel within said outer housing and for limiting relative axial movement between said mandrel and said outer housing, said cap member having an internal step adjacent said end wall for abutting engagement with an end face of said outer housing annular portion;
    (d) a first annular urethane cushion fitting tightly over said mandrel extension and being positioned within an annular cavity formed radially between said mandrel extension and said outer housing annular portion, and axially between said mandrel central portion and said outer housing pin end;
    (e) a second annular urethane cushion fitting tightly over said mandrel box end and positioned within a cavity formed radially between said cap member internal step and said mandrel box end;
    (f) a wiper ring positioned in an annular recess of said cap member bore for sealing engagement with said mandrel box; and
    (g) a rod seal positioned in an annular recess of said pin end through bore for sealing engagement with said mandrel extension.

* * * * *